(12) United States Patent
Manthiram et al.

(10) Patent No.: US 9,444,119 B2
(45) Date of Patent: Sep. 13, 2016

(54) LITHIUM/DISSOLVED POLYSULFIDE RECHARGEABLE LITHIUM—SULFUR BATTERIES AND METHODS OF MAKING THE SAME

(71) Applicants: Arumugam Manthiram, Austin, TX (US); Yongzhu Fu, Austin, TX (US)

(72) Inventors: Arumugam Manthiram, Austin, TX (US); Yongzhu Fu, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 330 days.

(21) Appl. No.: 13/793,418

(22) Filed: Mar. 11, 2013

(65) Prior Publication Data

US 2014/0255797 A1    Sep. 11, 2014

(51) Int. Cl.
| | |
|---|---|
| *H01M 10/052* | (2010.01) |
| *H01M 10/056* | (2010.01) |
| *H01M 4/136* | (2010.01) |
| *H01M 4/38* | (2006.01) |
| *H01M 4/58* | (2010.01) |
| *H01M 4/66* | (2006.01) |

(Continued)

(52) U.S. Cl.
CPC ........... *H01M 10/052* (2013.01); *H01M 4/136* (2013.01); *H01M 4/38* (2013.01); *H01M 4/5815* (2013.01); *H01M 4/663* (2013.01); *H01M 4/806* (2013.01); *H01M 10/0567* (2013.01); *H01M 10/0568* (2013.01); *H01M 10/0569* (2013.01); *Y02E 60/122* (2013.01)

(58) Field of Classification Search
USPC ............... 429/50–52, 188, 189, 301–347, 429/199–207, 208–246
See application file for complete search history.

(56) References Cited

U.S. PATENT DOCUMENTS

| | | | | |
|---|---|---|---|---|
| 6,194,099 | B1 * | 2/2001 | Gernov et al. | 429/213 |
| 2013/0164626 | A1 * | 6/2013 | Manthiram | B82Y 30/00 |
| | | | | 429/231.8 |
| 2014/0220453 | A1 * | 8/2014 | Barchasz et al. | 429/303 |

FOREIGN PATENT DOCUMENTS

| | | | | |
|---|---|---|---|---|
| FR | 2979755 | * | 3/2013 | 429/303 |
| GB | 2424511 | | 9/2006 | H01M 10/40 |
| WO | WO 2013/030321 | | 3/2013 | H01M 4/66 |

OTHER PUBLICATIONS

International Search Report and Written Opinion; PCT/US2014/022949; pp. 14, Jun. 4, 2014.

(Continued)

*Primary Examiner* — Basia Ridley
*Assistant Examiner* — Caitlin Wilmot
(74) *Attorney, Agent, or Firm* — Baker Botts L.L.P.

(57) ABSTRACT

In one embodiment, the present disclosure relates to a rechargeable Li—S battery including a cathode including a firbrous carbon material, a catholyte including a polysulfide, and an anode. In another embodiment, the present disclosure relates to a charged or partially charged rechargeable Li—S battery including a cathode including a fibrous carbon material and amorphous microparticles of elemental sulfur, a catholyte including high-order polysulfides having a general formula of $Li_2S_n$, wherein n is at least eight, and an anode. In another embodiment, the present disclosure relates to a discharged or partially discharged rechargeable Li—S battery including a cathode including a fibrous carbon material and amorphous microparticles of $Li_2S$, a catholyte including a negligible amount of polysulfides, and an anode.

18 Claims, 10 Drawing Sheets

(10 of 10 Drawing Sheet(s) Filed in Color)

(51) Int. Cl.
  *H01M 4/80* (2006.01)
  *H01M 10/0567* (2010.01)
  *H01M 10/0568* (2010.01)
  *H01M 10/0569* (2010.01)

(56) References Cited

OTHER PUBLICATIONS

Su et al.; "Self-weaving sulfur—carbon composite cathodes for high rate lithium—sulfur batteries"; Phys. Chem. Chem. Phys.; vol. 14; pp. 14495-14499, 2012.

Rauh et al.; "A lithium/dissolved sulfur battery with an organic electrolyte"; J. Electrochem. Soc.: Electrochemical Science and Technology; vol. 126, No. 4; pp. 523-527, 1979.

Yang et al.; "A Membrane-free lithium/polysulfide semi-liquid battery for large-scale energy storage"; Energy & Environmental Science, vol. 6; pp. 1552-1558, 2013.

Zhang et al.; "A new direction for the performance improvement of rechargeable lithium/sulfur batteries"; Journal of Power Sources, vol. 200; pp. 77-82, 2012.

Zu et al.; "Highly reversible Li/dissolved polysulfide batteries with binder-free carbon nanofiber electrodes"; Journal of Materials Chemistry A; vol. 1; pp. 10362-10367, 2013.

Fu et al.; "Highly reversible lithium/dissolved polysulfide batteries with carbon nanotube electrodes"; Angew. Chem. Int. Ed.; vol. 52; pp. 6930-6935, 2013.

PCT International Preliminary Report on Patentability for International Application No. PCT/US2014/022949 issued Sep. 15, 2015, 8 pages.

* cited by examiner

LITHIUM/DISSOLVED POLYSULFIDE RECHARGEABLE LITHIUM—SULFUR BATTERIES AND METHODS OF MAKING THE SAME

TECHNICAL FIELD

The current disclosure relates to lithium/dissolved polysulfide rechargeable lithium-sulfur (Li—S) batteries. Such batteries may contain a carbon electrode, such as a carbon nanotube electrode. Such batteries may also be highly reversible. The disclosure also relates to methods of making and operating such batteries.

BACKGROUND

Basic Principles of Batteries and Electrochemical Cells

Batteries may be divided into two principal types, primary batteries and secondary batteries. Primary batteries may be used once and are then exhausted. Secondary batteries are also often called rechargeable batteries because after use they may be connected to an electricity supply, such as a wall socket, and recharged and used again. In secondary batteries, each charge/discharge process is called a cycle. Secondary batteries eventually reach an end of their usable life, but typically only after many charge/discharge cycles.

Secondary batteries are made up of an electrochemical cell and optionally other materials, such as a casing to protect the cell and wires or other connectors to allow the battery to interface with the outside world. An electrochemical cell includes two electrodes, the positive electrode or cathode and the negative electrode or anode, an insulator separating the electrodes so the battery does not short out, and an electrolyte that chemically connects the electrodes.

In operation the secondary battery exchanges chemical energy and electrical energy. During discharge of the battery, electrons, which have a negative charge, leave the anode and travel through outside electrical conductors, such as wires in a cell phone or computer, to the cathode. In the process of traveling through these outside electrical conductors, the electrons generate an electrical current, which provides electrical energy.

At the same time, in order to keep the electrical charge of the anode and cathode neutral, an ion having a positive charge leaves the anode and enters the electrolyte and a positive ion also leaves the electrolyte and enters the cathode. In order for this ion movement to work, typically the same type of ion leaves the anode and joins the cathode. Additionally, the electrolyte typically also contains this same type of ion. In order to recharge the battery, the same process happens in reverse. By supplying energy to the cell, electrons are induced to leave the cathode and join the anode. At the same time a positive ion, such as $Li^+$, leaves the cathode and enters the electrolyte and a $Li^+$ leaves the electrolyte and joins the anode to keep the overall electrode charge neutral.

In addition to containing an active material that exchanges electrons and ions, anodes and cathodes often contain other materials, such as a metal backing to which a slurry is applied and dried. The slurry often contains the active material as well as a binder to help it adhere to the backing and conductive materials, such as a carbon particles. Once the slurry dries it forms a coating on the metal backing.

Unless additional materials are specified, batteries as described herein include systems that are merely electrochemical cells as well as more complex systems.

Several important criteria for rechargeable batteries include energy density, power density, rate capability, cycle life, cost, and safety. The current lithium-ion battery technology based on insertion compound cathodes and anodes is limited in energy density. This technology also suffers from safety concerns arising from the chemical instability of oxide cathodes under conditions of overcharge and frequently requires the use of expensive transition metals. Accordingly, there is immense interest to develop alternate cathode materials for lithium-ion batteries. Sulfur has been considered as one such alternative cathode material.

Lithium-Sulfur Batteries

Lithium-sulfur (Li—S) batteries are a particular type of rechargeable battery. Unlike most rechargeable batteries in which the ion actually moves into and out of a crystal lattice, the ion in lithium-sulfur batteries reacts with lithium in the anode and with sulfur in the cathode even in the absence of a precise crystal structure. In most Li—S batteries, the anode is lithium metal (Li or $Li^0$). In operation, lithium leaves the metal as lithium ions ($Li^+$) and enters the electrolyte when the battery is discharging. When the battery is recharged, lithium ions ($Li^+$) leave the electrolyte and plate out on the lithium metal anode as lithium metal (Li). At the cathode, during discharge, particles of elemental sulfur (S) react with the lithium ion ($Li^+$) in the electrolyte to form $Li_2S$. When the battery is recharged, lithium ions ($Li^+$) leave the cathode, allowing to revert to elemental sulfur (S).

Sulfur is an attractive cathode candidate as compared to traditional lithium-ion battery cathodes because it offers an order of magnitude higher theoretical capacity (1675 mAh $g^{-1}$) than the currently employed cathodes (<200 mAh $g^{-1}$) and operates at a safer voltage range (1.5-2.5 V). This high theoretical capacity is due to the ability of sulfur to accept two electrons ($e^-$) per atom. In addition, sulfur is inexpensive and environmentally benign.

However, the major problem with a sulfur cathode is its poor cycle life. The discharge of sulfur cathodes involves the formation of intermediate polysulfide ions, which dissolve easily in the electrolyte during the charge-discharge process and result in an irreversible loss of active material during cycling. The high-order polysulfides ($Li_2S_n$, $4 \leq n \leq 8$) produced during the initial stage of the discharge process are soluble in the electrolyte and move toward the lithium metal anode, where they are reduced to lower-order polysulfides. Moreover, solubility of these high-order polysulfides in the liquid electrolytes and nucleation of the insoluble low-order sulfides (i.e., $Li_2S_2$ and $Li_2S$) result in poor capacity retention and low Coulombic efficiency. In addition, shuttling of these high-order polysulfides between the cathode and anode during charging, which involves parasitic reactions with the lithium anode and re-oxidation at the cathode, is another challenge. This process results in irreversible capacity loss and causes the build-up of a thick, irreversible $Li_2S$ barrier on the electrodes during prolonged cycling, which is electrochemically inaccessible. Overall, the operation of Li—S cells is so dynamic that novel electrodes with optimized compositions and structure are needed to maintain the high capacity of sulfur and overcome the challenges associated with the solubility and shuttling of polysulfides. Thus, in prior Li—S batteries, polysulfides have been treated as an undesirable by-product of useful electrochemical reactions. For example, some prior batteries have sought to trap polysulfide within the cathode and have achieved an actual, reversible utilization of 1.3 $e^{-1}$ per sulfur atom.

Very early Li—S batteries used a Li/dissolved sulfur polysulfide systems in which a dissolved polysulfide ($Li_2S_n$, $n \geq 8$) electrolyte was used as a catholyte with a polytetrafluoroethylene-bonded carbon electrode. These batteries exhibited the ability to utilize 1.6 e⁻ per sulfur atom, but deteriorated after only ten to twenty cycles. A more recently construed similar battery using a porous carbon foam electrode similarly degraded after around twelve cycles. Thus, attempts to use polysulfides within a battery, rather than treat it as undesirable, have not been successful in obtaining a practical rechargeable battery.

In addition to problems with polysulfide formation, sulfur is an insulator with a resistivity of $5 \times 10^{-30}$ S cm$^{-1}$ at 25° C., resulting in a poor electrochemical utilization of the active material and poor rate capacity. Although the addition of conductive carbon to the sulfur material could improve the overall electrode conductivity, the core of the sulfur particles, which have little or no contact with conductive carbon, will still be highly resistive.

Previous attempts to address the conductivity problem have sought to increase the fraction of sulfur in contact with carbon. Several approaches have been pursued, such as forming sulfur-carbon composites with carbon black or nanostructured carbon. For example, a mesoporous carbon framework filled with amorphous sulfur with the addition of polymer has been found to exhibit a high reversible capacity of approximately 1000 mAh g$^{-1}$ after 20 cycles. However, most traditional methods to synthesize sulfur-carbon composites include processing by a sulfur melting route, resulting in high manufacturing costs due to additional energy consumption. Also, several reports have noted that the sulfur content in the sulfur-carbon composites synthesized by the sulfur melting route is limited to a relatively low value in order to obtain acceptable electrochemical performance, leading to a lower overall capacity of the cathode.

Moreover, synthesizing homogeneous sulfur-carbon composites through conventional heat treatment is complicated. In the conventional synthesis of sulfur-carbon composites, sulfur is first heated above its melting temperature, and the liquid sulfur is then diffused to the surface or into the pores of carbon substrates to form the sulfur-carbon composite. A subsequent high-temperature heating step is then required to remove the superfluous sulfur on the surface of the composites, leading to a waste of some sulfur. Thus, the conventional synthesis by the sulfur melting route may not be scaled-up in a practical manner to obtain a uniform industry-level sulfur-carbon composite.

As another alternative, a sulfur deposition method to synthesize a core-shell carbon/sulfur material for lithium-sulfur batteries has been recently reported. Although this process exhibited acceptable cyclability and rate capability, the sulfur deposition process is very sensitive and must be carefully controlled during synthesis. Otherwise, a composite with poor electrochemical performance is produced.

A more recent methodology of forming a sulfur-carbon composite overcomes many of these problems, but still experiences difficulties with polysulfides.

Therefore, there remains a need for a rechargeable Li—S battery with high reversibility and good cycle life that is able to constructively use polysulfides.

SUMMARY

In one embodiment, the present disclosure relates to a rechargeable Li—S battery including a cathode including a binder-free, self-weaving, firbrous carbon material, a catholyte including a polysulfide, and an anode.

In another embodiment, the present disclosure relates to a charged or partially charged rechargeable Li—S battery including a cathode including a fibrous carbon material and amorphous microparticles of elemental sulfur, a catholyte including high-order polysulfides having a general formula of Li$_2$S$_n$, wherein n is at least eight, and an anode.

In another embodiment, the present disclosure relates to a discharged or partially discharged rechargeable Li—S battery including a cathode including a fibrous carbon material and amorphous microparticles of Li$_2$S, a catholyte including negligible amounts of polysulfides, and an anode.

The following abbreviations are commonly used throughout the specification:
Li$^+$—lithium ion
Li or Li$^0$—elemental or metallic lithium or lithium metal
S—sulfur
Li—S—lithium-sulfur
Li$_2$S—lithium sulfide
LiCF$_3$SO$_3$—lithium trifluoromethanesulfonate
LiTFSI—lithium bis(trifluoromethanesulfonyl)imide
OCV—open circuit voltage
DME—dimethoxyethane
DOL—1,3-dioxolane
Tetraglyme—tetraethylene glycol dimethyl ether
MWCNT—multi-walled carbon nanotube
SEM—scanning electron microscope
STEM—scanning transmission electron microscope
XRD—X-ray diffraction
XPS—X-ray photon spectroscopy
LC—liquid chromatography

BRIEF DESCRIPTION OF THE DRAWINGS

A more complete understanding of the present embodiments and advantages thereof may be acquired by referring to the following description taken in conjunction with the accompanying drawings, which relate to embodiments of the present disclosure. The current specification contains color drawings. Copies of these drawings may be obtained from the USPTO.

FIG. 6 shows elemental mapping of carbon (FIG. 6A) and sulfur (FIG. 6B) on MWCNT cathode after discharge;

FIG. 8 shows X-ray photon spectroscopy (XPS) data for elements S 2p (FIG. 8A), and magnified XPS data (FIG. 8B);

DETAILED DESCRIPTION

The current disclosure relates to lithium/dissolved polysulfide rechargeable Li—S batteries. Such batteries may contain a binder-free, self-weaving carbon electrode, such as a carbon nanotube electrode. Such batteries may also be highly reversible. The disclosure also relates to methods of making and operating such batteries.

Li—S Batteries

Figure 1:
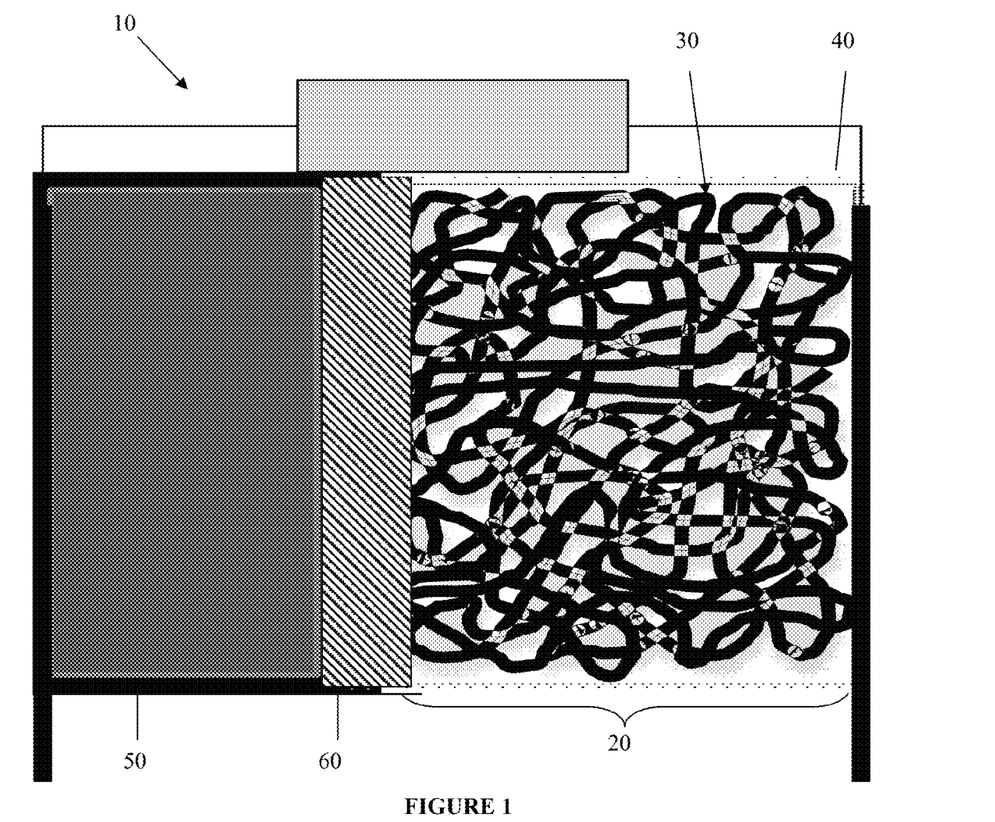
FIG. 1 provides a schematic of a lithium/dissolved polysulfide rechargeable Li—S battery.
Figure 2A:
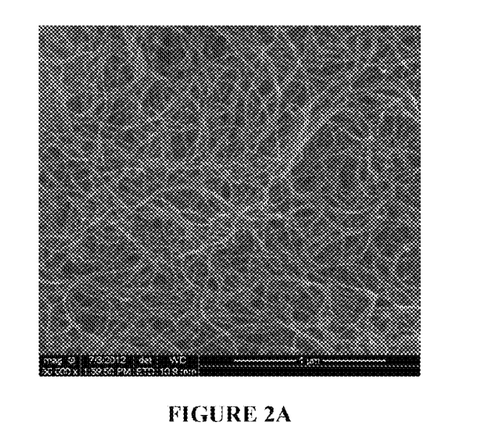
FIG. 2A shows a scanning electron microscope (SEM) image of MWCNT paper.
Figure 2B:
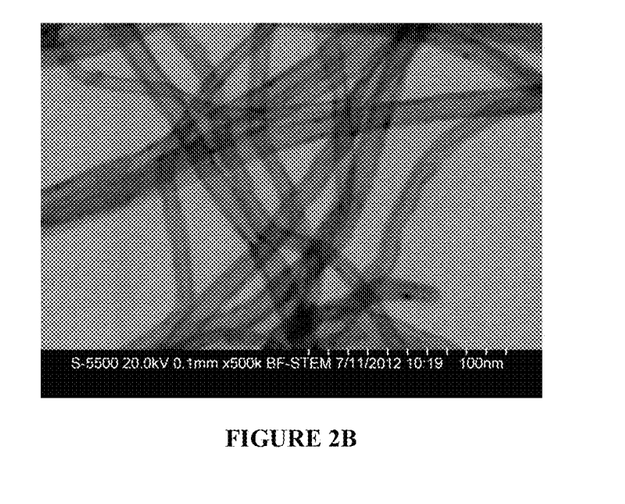
FIG. 2B shows a scanning transmission electron microscope (STEM) image of MWCNT paper.
Figure 3:
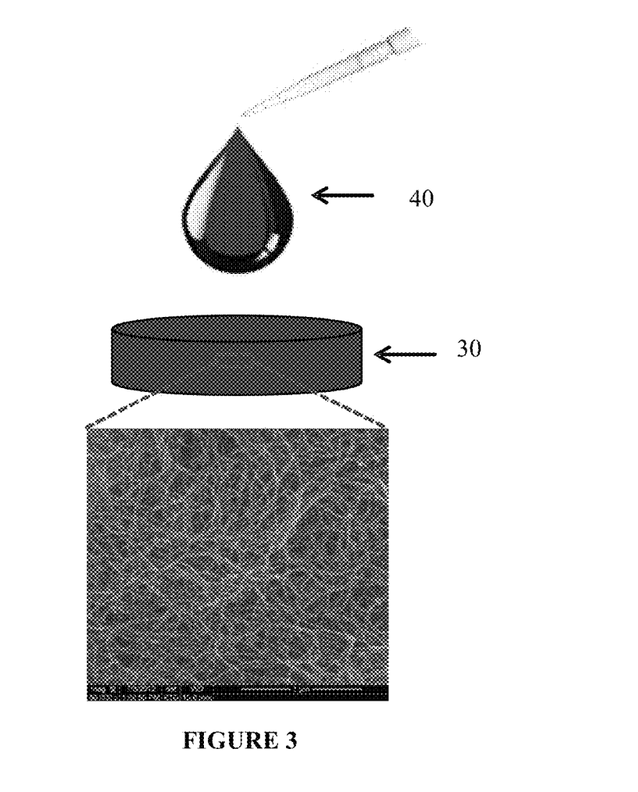
FIG. 3 illustrates a method of forming a cathode.

In a specific embodiment, shown in FIG. 1, the disclosure relates to a Li/polysulfide rechargeable Li—S battery 10 using a fibrous carbon-containing cathode 20. Cathode 20 may contain any carbon material with a fibrous structure 30. More specifically, the cathode may contain a self-weaving, free-standing multi-walled carbon nanotube (MWCNT) material, such as a paper, as shown in FIGS. 2 and 5. Alternatively, it may contain single-walled carbon nanotube (SWCNT) materials or carbon fiber materials. The cathode may be self-weaving and flexible.

The cathode may assemble when in the presence of a polysulfide catholyte 40. A "catholyte" as used herein, refers to a battery component that both functions as an electrolyte and contributes to the cathode. The battery may further contain an anode 50 suitable for use with the cathode and catholyte and in which lithium ions ($Li^+$) can intercalate or deposited, such as a lithium metal (Li or $Li^0$ anode), lithiated silicon, lithiated tin, or another lithium-containing material. Finally, the battery may contain an electrically insulative separator 60 between the cathode and anode. The separator may be permeable to the catholyte. Alternatively, in solid electrolyte systems, the separator may also be the electrolyte conducing lithium ions. Other separators may also be used, so long as the cathode and anode remain sufficiently electrically disconnected to allow battery function. The separator may commonly be a polymer, gel, or ceramic.

The polysulfide catholyte may contain a polysulfide with a nominal molecular formula of $Li_2S_6$. The polysulfide may, in some embodiments, contain components with the formula $Li_2S_n$, where $4 \leq n \leq 8$. In a more specific embodiment, the polysulfide may be present in an amount with a sulfur concentration of 1-8 M, more specifically, 1-5 M, even more specifically 1-2 M. For example, it may be present in a 1M amount, a 1.5 M amount, or a 2 M amount. The catholyte may also contain a material in which the polysulfide is dissolved. For example, the catholyte may also contain $LiCF_3SO_3$, LiTFSI, $LiNO_3$, dimethoxy ethane (DME), 1,3-dioxolane (DOL), tetraglyme, other lithium salt, other ether-based solvents, and any combinations thereof.

After the first charge of the battery, the catholyte may contain high-order polysulfides ($Li_2S_n$, $n \geq 8$).

After the first charge and subsequent charges, amorphous microparticles of elemental sulfur may form on the MWCNT. Accordingly, in some embodiments, cathode 20 may include MWCNT and attached elemental sulfur amorphous microparticles.

After any discharge, amorphous microparticles of $Li_2S$ may form on the MWCNT. Accordingly, in some embodiments, cathode 20 may include MWCNT and attached $Li_2S$ amorphous particles.

In some embodiments, polysulfides may also be trapped within the MWCNT cathode. However, while elemental sulfur and $Li_2S$ microparticles may be bound to the MWCNT such that they do not readily wash away, polysulfides may not be bound and may be readily removable.

In a particular embodiment, a battery may contain high-order polysulfides in the catholyte and amorphous elemental sulfur microparticles in the MWCNT cathode when charged. The amount of high-order polysulfides present in the catholyte when charged may be proportional to the amount of polysulfides present in the catholyte before the first charge. The battery may contain only small amounts of polysulfides in the catholyte and amorphous $Li_2S$ microparticles in the MWCNT when discharged. The amount of polysulfides in the catholyte may be negligible. For instance, it may be less than 10 wt %, less than 5 wt %, less than 2 wt %, less than 1 wt %, or substantially none. During discharge high-order polysulfides and elemental sulfur may be reduced. During charge, $Li_2S$ may transition to low-order polysulfides, then high-order polysulfides, and may transition to elemental sulfur.

During charge or discharge of the battery, the MWCNT cathode architecture may facilitate charge transport such that additional electrode components to enhance electrical conductivity are not needed. The MWCNT cathode may be sufficiently mechanically stable such that binder is not needed. In some embodiments, other stability enhancers, such as foil may also not be needed, although foil may be present in some embodiments to provide mechanical support, facilitate battery assembly, or enhance electrical conductivity with other battery components.

Batteries according to the present disclosure may have a discharge capacity of at least 1100 mAh/g (based on mass of sulfur atoms) at a rate of C/2. They may have a discharge capacity of at least 1300 mAh/g (based on mass of sulfur atoms) at a rate of C/5. They may have a discharge capacity of at least 1400 mAh/g (based on mass of sulfur atoms) at a rate of C/10.

In alternative embodiments, particularly those using carbon nanofiber electrodes discharge capacities may be lower. It may be at least 900 mAh/g (based on mass of sulfur atoms) at a rate of C/2, at least 1000 mAh/g (based on mass of sulfur atoms) at a rate of C/5, or at least 1100 mAh/g (based on mass of sulfur atoms) at a rate of C/10.

Batteries according to the present disclosure may have a capacity of at least 1.0 $e^-$ per sulfur atom at C/2 through C/10. More specifically, capacity may be at least 1.9 $e^-$ per sulfur atom at C/10, or at least 1.5 $e^-$ per sulfur atom at C/2.

Batteries according to the present disclosure may retain at least 85% of their discharge capacity over 50 cycles or even over 100 cycles when cycled between 1.8 V and 3.0 V. In more specific embodiments, they may retain at least 88% or even at least 93% of their discharge capacity over 50 cycles or even over 100 cycles when cycled between 1.8 V and 3.0 V. Batteries may retain at least 85%, at least 88%, or at least 93% of their discharge capacity over even 200 cycles if cycled in a narrow voltage window, such as 1.8 V to 2.2 V.

Batteries according to the present disclosure may have a Coulombic efficiency of at least 95%.

Batteries of the present disclosure may contain contacts, a casing, or wiring. In the case of more sophisticated batteries, they may contain more complex components, such as safety devices to prevent hazards if the battery overheats, ruptures, or short circuits. Particularly complex batteries may also contain electronics, storage media, processors, software encoded on computer readable media, and other complex regulatory components.

Batteries may be in traditional forms, such as coin cells or jelly rolls, or in more complex forms such as prismatic cells. Batteries may contain more than one electrochemical cell and may contain components to connect or regulate these multiple electrochemical cells.

Batteries of the present disclosure may be used in a variety of applications. They may be in the form of standard battery size formats usable by a consumer interchangeably in a variety of devices. They may be in power packs, for instance for tools and appliances. They may be usable in consumer electronics including cameras, cell phones, gaming devices, or laptop computers. They may also be usable in much larger devices, such as electric automobiles, motorcycles, buses, delivery trucks, trains, or boats. Furthermore, batteries according to the present disclosure may have industrial uses, such as energy storage in connection with energy production, for instance in a smart grid, or in energy storage for factories or health care facilities, for example in the place of generators.

Methods of Forming Li—S Batteries

The carbon nanotube or carbon-nanofiber portion of the cathode may be formed by a dispersion-filtration process. After its formation, it may be contacted with the catholyte, which may then enter the carbon material to form the cathode. During the first charge of the battery, $S_6^{2-}$ is oxidized to high-order polysulfides ($Li_2S_n$, $n \geq 8$) or to elemental sulfur or a sulfur material very similar in electrochemical behavior to elemental sulfur.

Amorphous microparticles of elemental sulfur may be formed on the MWCNT, particularly at the end of charging. Amorphous microparticles of $Li_2S$ may be formed on the MWCNT, particularly at the end of discharge. Polysulfides may become trapped in the MWCNT. The details of these processes and battery components that may be formed are described above or in the following examples.

EXAMPLES

The following examples are provided to further illustrate specific embodiments of the disclosure. They are not intended to disclose or describe each and every aspect of the disclosure in complete detail and should not be so interpreted.

Example 1

Formation of Lithium/Dissolved Polysulfide Rechargeable Li—S Battery

An example lithium/dissolved polysulfide rechargeable Li—S battery of the type shown in FIG. 1 was prepared. Self-weaving, free-standing MWCNT paper was prepared by a dispersion-filtration process. 75 mg of MWCNTs were wetted with 20 mL of isopropyl alcohol and then dispersed in 750 mL of de-ionized water by high-power ultrasonification for 15 minutes. The product was collected by vacuum filtration and washed with de-ionized water, ethanol, and acetone several times. The free-standing MWCNT paper thus formed was dried for 24 h at 100° C. in an air-oven for form a flexible film that could be easily peeled off the filter membrane. The MWCNT paper was then punched out in circular discs 1.2 cm in diameter, 40-50 µm thickness, 1.9-2.3 mg mass. An SEM image of the paper with catholyte added is provided as FIG. 2A; an STEM image is provided as FIG. 2B.

Blank electrolyte was prepared by dissolving the appropriate amount of $LiCF_3SO_3$ and $LiNO_3$ in a DME and DOL (1:1 v/v) mixture solvent to render a 1 M $LiCF_3SO_3$ and 0.1 M $LiNO_3$ solution.

The polysulfide catholyte contained 1-2 M sulfur with a nominal molecular formula of $Li_2S_6$. The catholyte was prepared by adding elemental sulfur and an appropriate amount of $Li_2S$ to the blank electrolyte. The mixture solution was heated at 40-60° C. in an Ar-filled glove box for 18 h to produce a dark yellow solution with moderate viscosity.

Lithium/dissolved polysulfide rechargeable Li—S batteries (CR2032 coin cells) were assembled in an Ar-filled glove box. First, 40 µL of polysulfide catholyte was added into the MWCNT paper electrode. Then a Celgard separator was placed on the top of the MWCNT electrode. 20 µL of blank electrolyte was added on the separator followed by, respectively, another separator and 20 µL of blank electrolyte. Finally, a lithium metal anode was placed on the separator.

Figure 4:
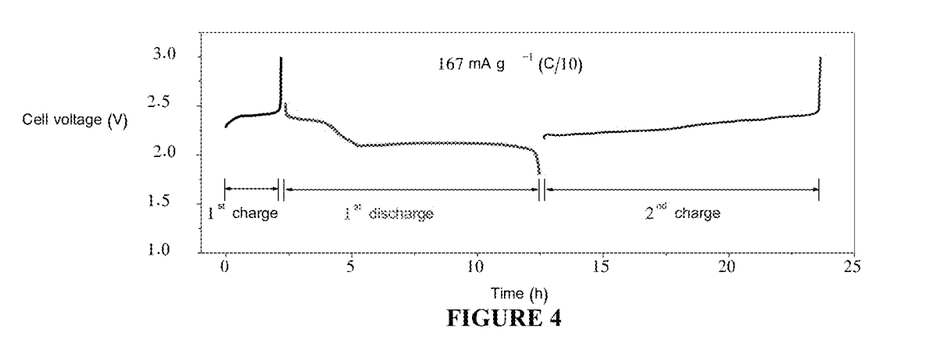
FIG. 4 shows a voltage vs. time profile for the 1st charge, 1st discharge, and 2nd charge of a lithium/dissolved polysulfide rechargeable Li—S battery at C/10 rate.

The battery had an open circuit voltage (OCV) of 2.28 V and was initially charged to 3.0 V followed by full discharge and charge in the voltage range of 3.0-1.8 V as shown in FIG. 4. During the 1st charge, a single voltage plateau is seen, which depicts the process of oxidation of $S_6^{2-}$ to high-order polysulfides ($Li_2S_n$, $n \geq 8$) or to elemental sulfur. After the first discharge, two plateaus are seen, consistent with the discharge profile of conventional Li—S batteries. This confirms that the 1st charge process converts polysulfides in the catholyte to an electrochemical state similar to that of elemental sulfur. In the subsequent, second charge, the voltage plateaus are similar to those of Li—S batteries.

Example 2

Chemical Analysis of MWCNT and Microparticles

Figure 5A:
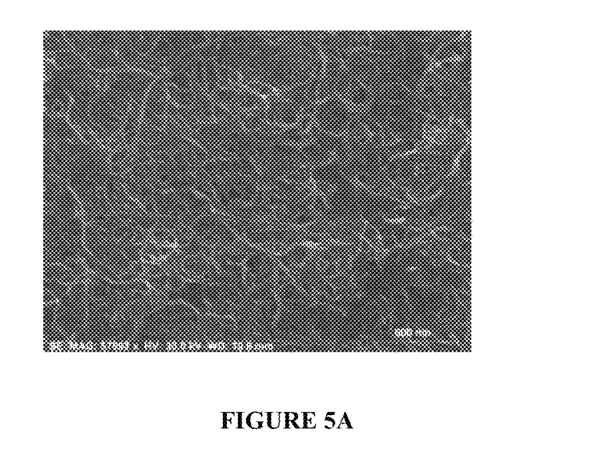
FIG. 5A shows an SEM image of the MWCNT cathode after discharge.
Figure 5B:
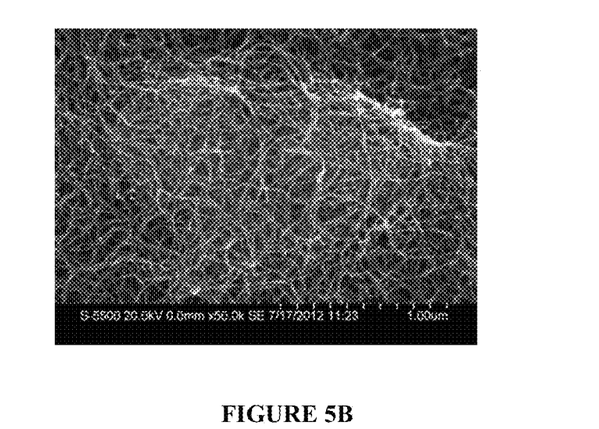
FIG. 5B shows an SEM image of a microparticle of lithium sulfide formed after discharge.
Figure 6A:
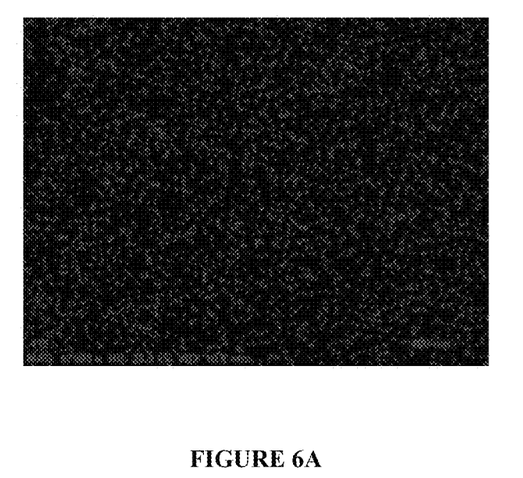
Figure 6B:
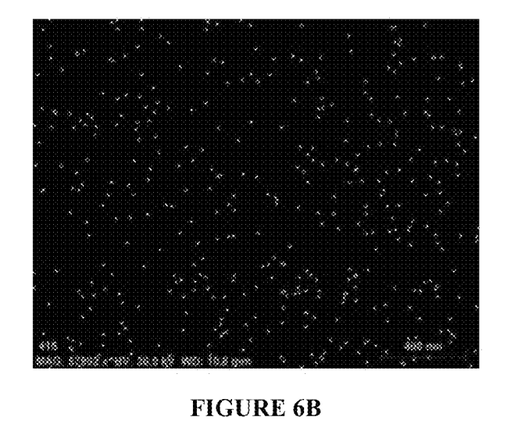

An SEM image of the MWCNT cathode after discharge is provided in FIG. 5A. The image shows that the porous MWCNT network is filled with microsized particles of discharged products and lithium salts, and that sulfur is uniformly distributed. The uniform distribution of sulfur was confirmed using elemental mapping, as shown in FIG. 6.

Figure 5C:
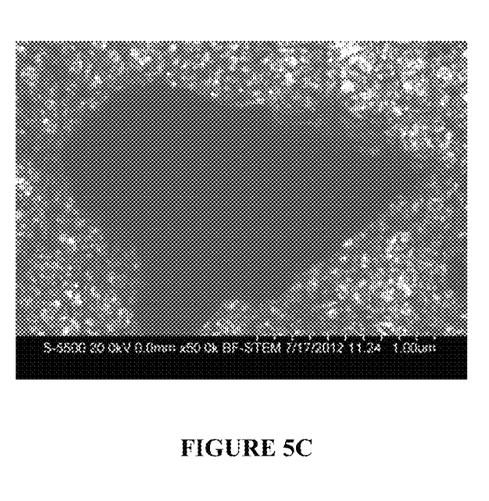
FIG. 5C shows an STEM image of a microparticle of lithium sulfide formed after discharge.
Figure 5D:
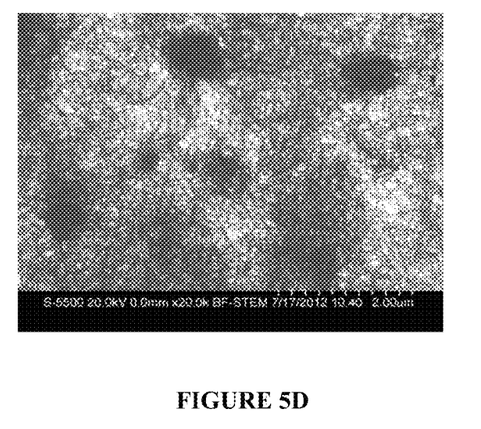
FIG. 5D shows a low magnification STEM image of and MWCNT cathode with microparticles of sulfur after charge.
Figure 5E:
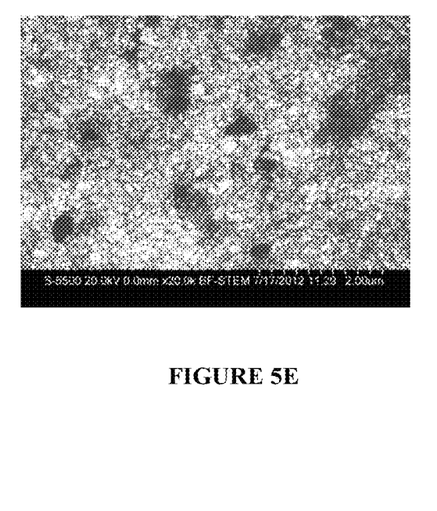
FIG. 5E shows a low magnification STEM image of and MWCNT cathode with microparticles of lithium sulfide after discharge.

The MWCNT was washed with DME/DOL (1:1, v/v) solvent to thoroughly remove soluble materials. A representative microsized particle, which was completely wrapped by carbon nanotubes and embedded in the MWCNT, was observed by SEM (FIG. 5B) and STEM (FIG. 5C). Low magnification STEM revealed that similar particles are dispersed within both the charged (FIG. 5D) and discharged (FIG. 5E) MWCNT cathodes.

Figure 7:
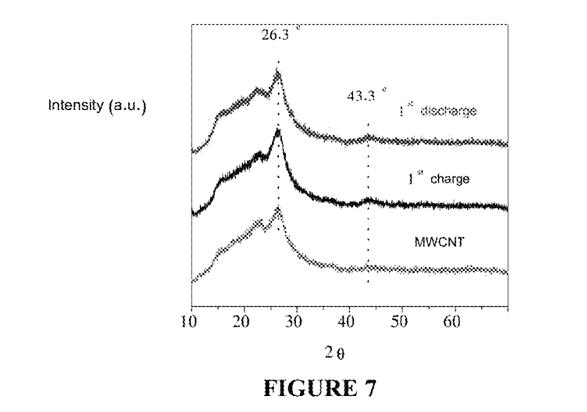
FIG. 7 shows X-ray diffraction (XRD) data for pristine MWCNT paper and cycled MWCNT cathodes.

XRD analysis (FIG. 7) of pristine MWCNT paper and cycled MWCNT cathodes after washing showed broad peaks at 2θ between 10° and 35°, which are attributed to the Kapton® (DuPont, US) films covering the three samples. A sharp peak at 2θ=26.3° and a small peak at 2θ=43.3° correspond, respectively, to the (002) plane and (100) plane of graphitized MWCNTs. Cycled MWCNT cathodes showed patterns almost identical to those of pristine MWCNT without any obvious peaks for elemental sulfur or $Li_2S$, indicating that the insoluble particles produced during charge and discharge exist in an amorphous state without long-range order.

Figure 8A:
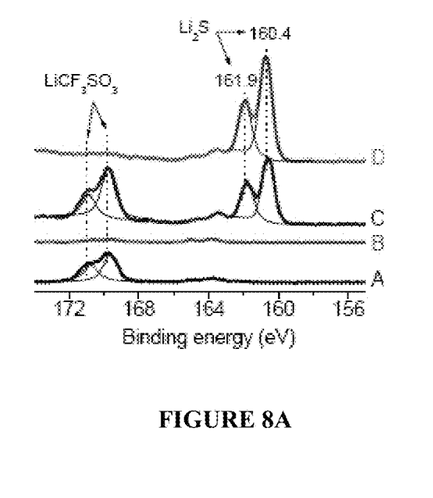

Cycled MWCNT cathodes were analyzed by XPS before and after washing to identify the composition of the insoluble microparticles. No obvious bonding energy shifts among the four samples were found for the elements F 1s and C 1s (data not shown) except a reduction in peak intensity due to the removal by washing of $LiCF_3SO_3$ and electrolyte. FIG. 8A presents S $2p_{1/2}$ and S $2p_{3/2}$ dual peaks with an intensity ratio of 1:2 arising from spin orbit coupling. Peaks at 171.1 and 169.8 eV were only present before washing, and are characteristic of soluble $LiCF_3SO_3$. Two strong peaks at low binding energies (161.9 eV and 160.4 eV) were only observed in discharged MWCNT cathodes and correspond to $Li_2S$. The peak intensities did not decrease after washing, indicting the particles seen in FIG. 5 are insoluble $Li_2S$ within the MWCNT network.

Figure 8B:
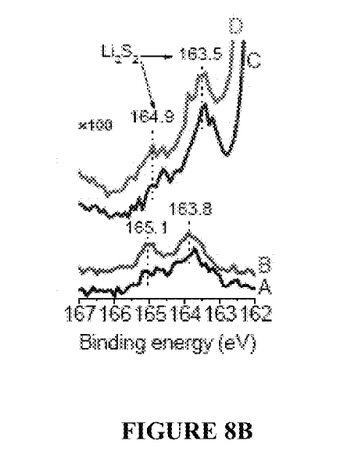

FIG. 8B shows magnified peaks (100×) in the wavelength region between 167 and 162 eV. The small dual peaks at 165.1 and 163.8 eV correspond to elemental sulfur. The weak peaks likely result from a small amount of element sulfur present during XPS measurement as a result of XPS-induced sulfur evaporation. These data indicate that elemental sulfur does form at the end of charging. Two minor peaks at lower binding energies (164.9 and 163.5 eV) were observed in discharged samples, which may be attributable to small amounts of insoluble $Li_2S_2$, an incomplete discharge product.

Figure 9:
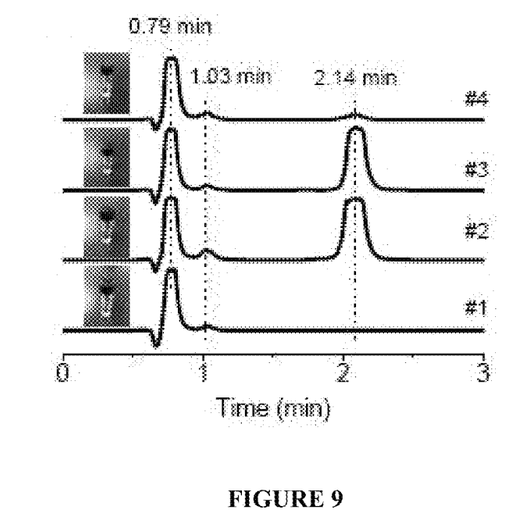
FIG. 9 shows liquid chromatography (LC) spectra and photographs for blank electrolyte (#1), polysulfide catholyte (#2), and analytes after the first charge (#3) and discharge (#4) of a lithium/dissolved polysulfide rechargeable Li—S battery.

All parts within a cycled battery were washed and the washing solution was analyzed by LC. FIG. 9 shows the LC spectra along with photographs of blank electrolyte, polysulfide catholyte, and analytes after the first charge and discharge. The blank electrolyte, a clear and transparent liquid, shows two peaks at retention times of 0.79 and 1.03 min with correspond to the lithium salt and solvent. A third peak, at a retention time of 2.14 min, observed in the yellow polysulfide catholyte corresponds to polysulfides, which also appear in the analytes after the first charge (a strong peak) and the discharge (a small peak). The color of the two analytes, as an indication of the polysulfide concentration, is also consistent with the peak intensities. The qualitative findings along with the XPS analysis indicate that the charged catholyte contains soluble high-order polysulfides and insoluble elemental sulfur is within the MWCNT cathode. In contrast, the discharge product in the form of insoluble $Li_2S$ remains largely in the MWCNT cathode, leaving a negligible quantity of un-reacted polysulfides within the discharged catholyte.

Example 3

Figure 10A:
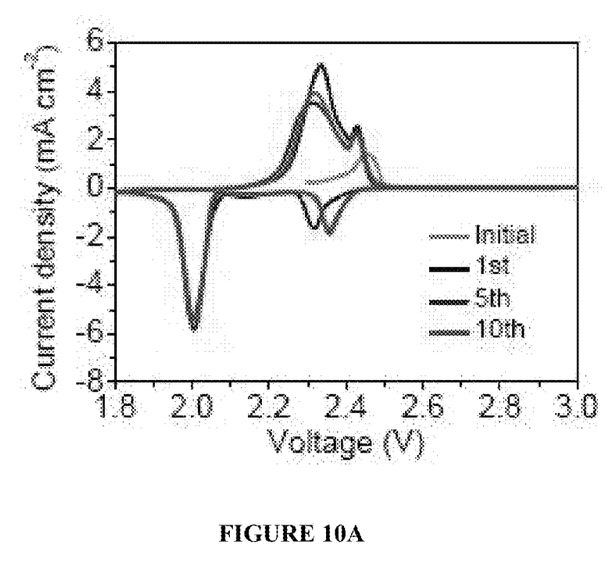
FIG. 10A shows cyclic voltammograms of a lithium/dissolved polysulfide rechargeable Li—S battery.
Figure 10B:
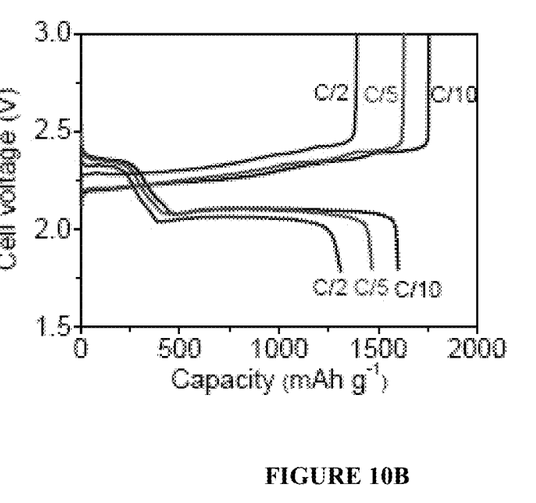
FIG. 10B shows voltage profiles or initial galvanostatic cycles of a lithium/dissolved polysulfide rechargeable Li—S battery at different rates.
Figure 10C:
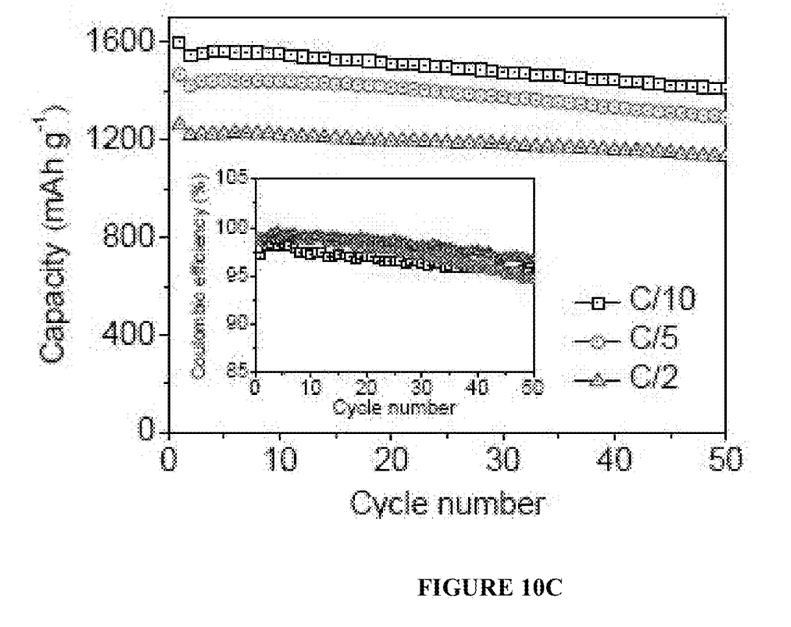
FIG. 10C shows extended cycling and Coulombic efficiency data of a lithium/dissolved polysulfide rechargeable Li—S battery.
Figure 11:
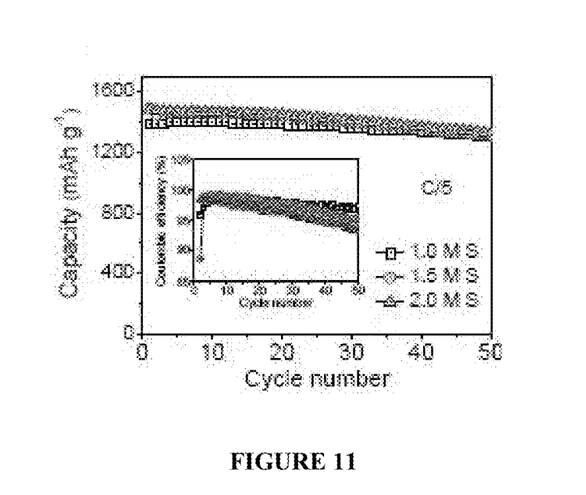
FIG. 11 shows the cyclability at C/5 rate of a lithium/dissolved polysulfide rechargeable Li—S batteries with 1.0 M, 1.5 M or 2.0 M polysulfide catholyte.
Figure 12:
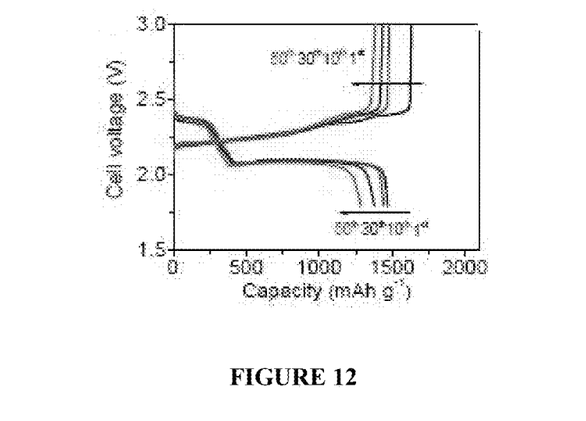
FIG. 12 shows the first, tenth, thirtieth, and fiftieth charge and discharge voltage profiles of a 1.5 M polysulfide catholyte lithium/dissolved polysulfide rechargeable Li—S battery at a C/5 rate.

Electrochemical Analysis of Lithium/Dissolved Polysulfide Rechargeable Li—S Battery FIGS. 10, 11 and 12 present electrochemical data for batteries prepared as in Example 1. FIG. 10A presents cyclic voltammograms of the battery. The potential was initially swept from OCV to 3.0 V followed by 10 cycles between 3.0 and 1.8 V at a rate of 0.1 mV/s. Two cathodic peaks are shown corresponding to the reduction reactions of high-order polysulfides and elemental sulfur. Two distinguishable anodic peaks correspond to the staged transition of $Li_2S$ to low-order polysulfides (e.g. $Li_2S_4$) and of high-order polysulfides to element sulfur.

The battery exhibited a very stable cycling profile without an obvious decrease in peak intensity, revealing high reversibility of the cathode reactions during the 10 cycles, except during the initial sweep and first cycle.

FIG. 10B shows voltage profiles of initial galvanostatic cycles at different rates. The batteries exhibit discharge capacities of 1,600 mAh/g, 1,469 mAh/g, and 1,261 mAh/g (based on mass of sulfur atoms) at C/10, C/5 and C/2 rates. These capacities correspond to greater than 1.9 $e^-$ per sulfur atom at C/10 and greater than 1.5 $e^-$ per sulfur atom at C/2.

FIG. 10C presents extended cycling and Coulombic efficiency data. Reversible capacities (based on mass of sulfur atoms) after 50 cycles remain at 1,411 mAh/g at C/10, 1,317 mAh/g at C/5, and 1,179 mAh/g at C/2. These capacities are more than double those of conventional sulfur cathodes. The Coulombic efficiency is greater than 95% with a degradation trend similar to that observed for capacity.

FIG. 11 shows the cyclability at C/5 rate of batteries with 1.0 M, 1.5 M or 2.0 M polysulfide catholyte. Small differences in the discharge capacities were observed as a function of polysulfide concentration. Much more substantial differences in Coulombic efficiency were observed as a function of polysulfide concentration. The sulfur content of the MWCNT cathodes was 36 wt % for 1.0 M polysulfide catholyte, 46 wt % for 1.5 M polysulfide catholyte, and 53 wt % for 2.0 M polysulfide catholyte. This is on par with other reported sulfur-carbon composite electrode materials. However, batteries of the present disclosure exhibited improved reversibility at high capacity as compared to prior sulfur-carbon composite materials.

Without limiting the invention, this is likely because of the intertwined MWCNT cathode architecture. Upon cycling, the formation of solid sulfur products leads to an expansion of the MWCNT network, whereas conversion of the solid sulfur products to dissolved polysulfides leads to a contract of interspaces between carbon nanotubes in the MWCNT. The reversibility of cathode reactions exhibited by MWCNT/polysulfide catholyte batteries is likely sustained by the excellent flexibility and mechanical reversibility of the carbon nanotubes.

Figure 13:
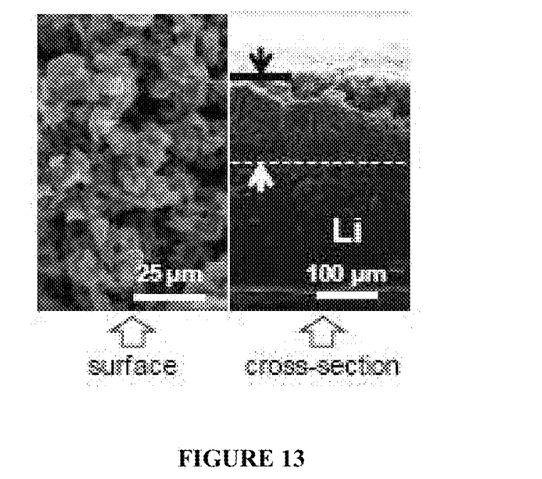
FIG. 13 shows an SEM image of a lithium metal anode in a lithium/dissolved polysulfide rechargeable Li—S battery after extended cycling.
Figure 14:
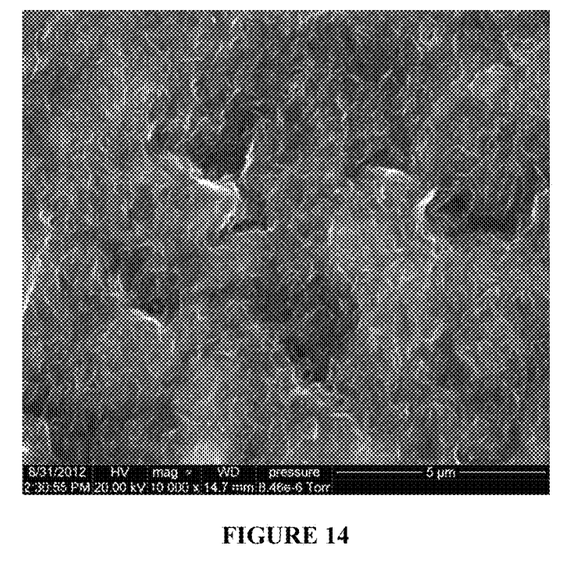
FIG. 14 shows an SEM image of a MWCNT cathode in a lithium/dissolved polysulfide rechargeable Li—S battery after extended cycling.

FIG. 12 shows the first, tenth, thirtieth, and fiftieth charge and discharge voltage profiles of a 1.5 M polysulfide catholyte battery at a C/5 rate A slight reduction in discharge voltage is observed with extended cycling and the discharge capacity steadily decreases with cycle number. The capacity loss is likely due to continuous Li metal anode corrosion caused by soluble polysulfides, which form a $Li_2S/Li_2S_2$ solid electrolyte interface film on the Li anode surface. This passivation layer may be seen in FIG. 13 and is rich in sulfur due to the reaction between polysulfides and lithium. Not only does this reaction reduce anode function, it also results in loss of active battery materials. However, a similar passivation layer is not observed in the MWCNT cathode after cycling, as shown in FIG. 14.

Example 4

Additional Materials and Test Methods

Pristine MWCNTs with a diameter of 10-20 nm were synthesized by a chemical vapor deposition process. Lithium metal foil (99.9%) was purchased from Sigma-Aldrich (St. Louis, Mo.). Sublimed sulfur powder (99.5%), Li$_2$S (99.9%), LiCF$_3$SO$_3$ (98%), DME (99+%) DOL (99.5%) and LiNO$_3$ (99+%) were purchased from Acros Organics (New Jersey). Celgard® 2400 polypropylene separators used in batteries of these examples were purchased from Celgard (Charlotte, N.C.).

Cycled cells, either 1$^{st}$ charged or 1$^{st}$ discharged, were opened in the Ar-filled glove box. Some cycled MWCNT cathodes were washed with DME/DOL (1:1 v/v) solvent thoroughly for SEM, STEM, and XPS measurements.

Morphological characterizations were carried out with a FEI Quanta 650 scanning electron microscope (SEM) and a Hitachi S-5500 SEM equipped with a scanning transmission electron microscope (STEM).

The elemental mapping results were examined with an energy dispersive spectrometer (EDS) attached to the FEI Quanta 650 SEM.

The XRD data were collected on a Philips X-ray diffractometer equipped with CuKα radiation in steps of 0.02°. XRD samples were covered by Kapton films in an Ar-filled glove box.

X-ray photoelectron spectroscopy (XPS) data were collected at room temperature with a Kratos Analytical spectrometer and monochromatic Al Kα (1486.6 eV) X-ray source.

Liquid chromatography (LC) data were acquired on a Dionex Ultimate 3000 HPLC system. All parts of the cycled batteries including lithium metal anode, separator, coin cell components, and MWCNT cathode were washed with 10 mL of DME/DOL (1:1 v/v) solvent to obtain analytes. 40 µL of blank electrolyte and polysulfide catholyte were diluted with 10 mL of DME/DOL (1:1 v/v) solvent for a comparison. An aliquot of each sample was injected onto a Phenomenex Gemini C18 column (5 micron, 2×50 mm) and eluted with 100% methanol at a flow rate of 0.2 mL min$^{-1}$.

UV detection was performed at 254 nm.

Cyclic voltammetry data were collected with a VoltaLab PGZ402 with an assembled coin cell between 1.8 and 3.0 V at a scan rate of 0.1 mV s$^{-1}$.

Electrochemical performances of the coin cells were galvanostatically evaluated with an Arbin battery test station between 1.8 and 3.0 V at various C rates.

Although only exemplary embodiments of the disclosure are specifically described above, it will be appreciated that modifications and variations of these examples are possible without departing from the spirit and intended scope of the disclosure. For instance, numeric values expressed herein will be understood to include minor variations and thus embodiments "about" or "approximately" the expressed numeric value unless context, such as reporting as experimental data, makes clear that the number is intended to be a precise amount. Additionally, one of ordinary skill in the art will appreciate that a cathode containing MWCNT and catholyte or microparticles as described herein or a cathode/catholyte combination may be prepared in accordance with the present disclosure independently from the anode. Such cathodes or cathode/catholyte combinations would clearly be intended for use in batteries of the present disclosure.

The invention claimed is:

1. A rechargeable Li—S battery comprising:
a catholyte comprising a polysulfide;
a cathode comprising a binder-free, self-weaving, free-standing multi-walled carbon nanotube (MWCNT) and a portion of the catholyte; and
an anode.

2. The battery of claim 1, wherein the MWCNT comprises a self-assembling paper.

3. The battery of claim 1, wherein catholyte polysulfide has a nominal molecular formula of Li$_2$S$_6$.

4. The battery of claim 1, wherein the polysulfide is present in the catholyte in an amount in which the sulfur concentration is from 1M to 8 M.

5. The battery of claim 1, wherein the catholyte further comprises LiCF$_3$ SO$_3$, LiTFSI, LiNO$_3$, dimethoxy ethane (DME), 1,3-dioxolane (DOL), tetraglyme, other lithium salt, other ether-based solvents, and any combinations thereof.

6. A charged or partially charged rechargeable Li—S battery comprising:
a cathode comprising a binder-free, self-weaving, free-standing multi-walled carbon nanotube (MWCNT) and amorphous microparticles of elemental sulfur derived from a catholyte;
the catholyte comprising high-order polysulfides having a general formula of Li$_2$S$_n$, wherein n is at least eight; and
an anode.

7. The battery of claim 6, wherein the MWCNT comprises a self-assembling paper.

8. The battery of claim 6, wherein the high-order polysulfides are derived from a catholyte with a nominal molecular formula of Li$_2$S$_6$ through charging of the battery.

9. The battery of claim 6, wherein the catholyte further comprises LiCF$_3$ SO$_3$, LiTFSI, LiNO$_3$, dimethoxy ethane (DME), 1,3-dioxolane (DOL), tetraglyme, other lithium salt, other ether-based solvents, and any combinations thereof.

10. The battery of claim 6, wherein the battery has a discharge capacity of at least 900 mAh/g, based on mass of sulfur atoms, at a rate of C/2, a discharge capacity of at least 1000 mAh/g, based on mass of sulfur atoms, at a rate of C/5, or a discharge capacity of at least 1100 mAh/g, based on mass of sulfur atoms, at a rate of C/10.

11. The battery of claim 6, wherein the battery retains at least 85% discharge capacity over fifty charge/discharge cycles at a voltage range of 1.8 V to 3.0 V.

12. A discharged or partially discharged rechargeable Li—S battery comprising:
a cathode comprising a binder-free, self-weaving, free-standing multi-walled carbon nanotube (MWCNT) and amorphous microparticles of Li$_2$S;
a catholyte comprising polysulfides; and
an anode.

13. The battery of claim 12, wherein the MWCNT comprises a self-assembling paper.

14. The battery of claim 12, wherein the Li$_2$S is derived from a catholyte with a nominal molecular formula of Li$_2$S$_6$ through discharging of the battery.

15. The battery of claim 12, wherein the Li$_2$S is derived from polysulfides and elemental sulfur particles present in the cathode.

16. The battery of claim 12, wherein the catholyte further comprises LiCF$_3$ SO$_3$, LiTFSI, LiNO$_3$, dimethoxy ethane (DME), 1,3-dioxolane (DOL), tetraglyme, other lithium salt, other ether-based solvents, and any combinations thereof.

17. The battery of claim 12, wherein the battery has a discharge capacity of at least 900 mAh/g, based on mass of sulfur atoms, at a rate of C/2, a discharge capacity of at least 1000 mAh/g, based on mass of sulfur atoms, at a rate of C/5, or a discharge capacity of at least 1100 mAh/g, based on mass of sulfur atoms, at a rate of C/10.

18. The battery of claim 12, wherein the battery retains at least 85% discharge capacity over fifty charge/discharge cycles at a voltage range of 1.8 V to 3.0 V.

* * * * *